US010323784B2

(12) United States Patent
LaCanfora et al.

(10) Patent No.: US 10,323,784 B2
(45) Date of Patent: Jun. 18, 2019

(54) INSULATION SLEEVE (71) Applicant: Crissair, Inc., Valencia, CA (US)

(72) Inventors: Patrick J. LaCanfora, Moorpark, CA (US); Lior Inberg, Valencia, CA (US)

(73) Assignee: CRISSAIR, INC., Valencia, CA (US)

( * ) Notice: Subject to any disclaimer, the term of this patent is extended or adjusted under 35 U.S.C. 154(b) by 60 days.

(21) Appl. No.: 15/688,181

(22) Filed: Aug. 28, 2017

(65) Prior Publication Data

US 2018/0058622 A1 Mar. 1, 2018

Related U.S. Application Data

(60) Provisional application No. 62/381,938, filed on Aug. 31, 2016.

(51) Int. Cl.
| | |
|---|---|
| *F16L 57/00* | (2006.01) |
| *F16L 57/04* | (2006.01) |
| *F16L 59/02* | (2006.01) |
| *B32B 1/08* | (2006.01) |
| *B32B 25/02* | (2006.01) |
| *B32B 25/10* | (2006.01) |
| *B32B 25/20* | (2006.01) |
| *B32B 5/02* | (2006.01) |
| *F16L 59/16* | (2006.01) |

(52) U.S. Cl.
CPC ............... *F16L 57/04* (2013.01); *B32B 1/08* (2013.01); *B32B 5/02* (2013.01); *B32B 25/02* (2013.01); *B32B 25/10* (2013.01); *B32B 25/20* (2013.01); *F16L 59/023* (2013.01); *F16L 59/161* (2013.01); *B32B 2250/03* (2013.01); *B32B 2250/40* (2013.01); *B32B 2260/021* (2013.01); *B32B 2260/048* (2013.01); *B32B 2262/101* (2013.01); *B32B 2262/108* (2013.01); *B32B 2307/304* (2013.01); *B32B 2307/3065* (2013.01)

(58) Field of Classification Search
CPC ....... F16L 59/02; F16L 59/022; F16L 59/023; F16L 59/029
USPC ................ 138/151, 156, 161, 163
See application file for complete search history.

(56) References Cited

U.S. PATENT DOCUMENTS

| | | | | |
|---|---|---|---|---|
| 4,807,669 A | * | 2/1989 | Prestidge, Sr. ....... | F16L 59/161 137/375 |
| 5,632,919 A | * | 5/1997 | MacCracken ....... | H01J 37/3244 138/33 |

(Continued)

*Primary Examiner* — Patrick F Brinson
(74) *Attorney, Agent, or Firm* — Brinks Gilson & Lione; Ryan L. Marshall; Jonathan Hartley (57) ABSTRACT

An insulation sleeve for insulating a component includes an inner layer, an outer layer, an insulating material, and a flap covering a seam passing from an outside surface to an internal surface of the insulation sleeve. The inner layer is a material having low thermal conductivity, resistance to high temperatures, is elastic/semi-rigid, and has an inner surface formed to a shape to fit the component. The outer layer has a material having low thermal conductivity, resistance to high temperatures, and is elastic/semi-rigid. The insulating material is positioned between the inner layer and the outer layer and has low thermal conductivity, low heat storage, and resistance to high temperatures. The flap is a material having low thermal conductivity and resistance to high temperatures, and is secured to the outer layer at a first location and releasably secured outer layer at a second location.

11 Claims, 6 Drawing Sheets

(56) References Cited

U.S. PATENT DOCUMENTS

| | | | | |
|---|---|---|---|---|
| 5,714,738 | A * | 2/1998 | Hauschulz | F16L 53/35 219/535 |
| 5,941,287 | A * | 8/1999 | Terito, Jr. | F16L 59/161 138/149 |
| 6,298,882 | B1 * | 10/2001 | Hayes | F16L 55/005 138/110 |
| 6,907,907 | B2 * | 6/2005 | Maida | F16L 59/106 138/149 |
| 2008/0006434 | A1 * | 1/2008 | Nygaard | F16L 59/026 174/93 |
| 2014/0029925 | A1 * | 1/2014 | Smith | H05B 3/02 392/468 |
| 2014/0305534 | A1 * | 10/2014 | Peil | F16L 59/029 138/151 |

* cited by examiner

INSULATION SLEEVE

This application claims the benefit under 35 U.S.C. § 119(e) of U.S. Provisional Patent Application No. 62/381,938, filed Aug. 31, 2016, and titled "Insulation Sleeve," which is incorporated, in its entirety, by this reference.

BACKGROUND

Figure 1:
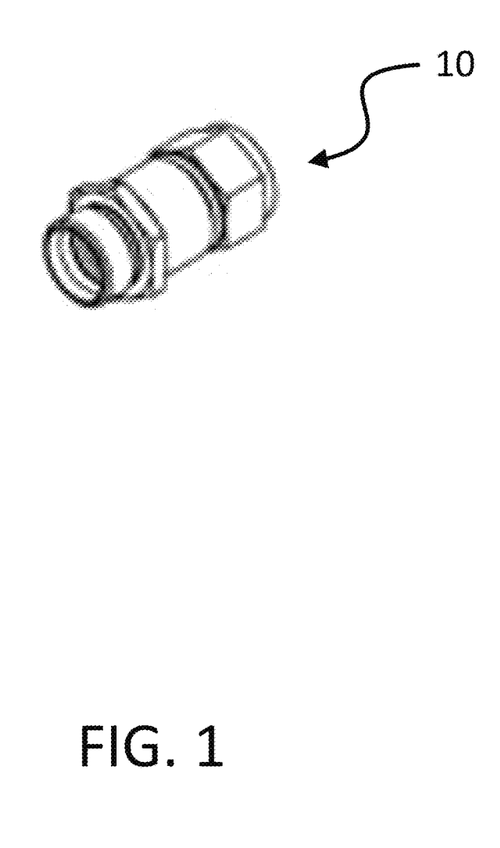
FIG. 1 illustrates an example of an aircraft component to be protected.

A typical aircraft includes a large number of components such as hydraulic line and valves. These components are vital to the proper operation of an aircraft and may be responsible for items such as control systems, supply of power, and actuation of various items. In an effort to improve the safety of an aircraft, there is currently a push to ensuring these components will continue to operate in adverse conditions, such as a fire. For example, FIG. 1 illustrates an example of a check valve 10 for use in an aircraft hydraulic system. Ideally, the check valve 10 should continue operating if exposed to hot gases, such as a fire.

Current techniques for protecting a component are inadequate for the extreme conditions that an aircraft component may be subject to. For example, in the event of a fire a component may be subject to extreme temperature caused by the combustion of jet fuel, or may encounter corrosive fluids such as hydraulic fluid. Furthermore, it is essential that any modification of a component to protect against these conditions be simple to use and not impact the overall weight of the aircraft significantly.

One traditional method of insulating a component is to wrap the component in a blanket of insulating fibers such as mineral wool. While effective against heat in general, a blanket of mineral wool tends to absorb oil which may lead to degradation or ignition of the oil when heated.

Another method for insulating a component has been to place a heat shield such as a hard shell between the heat source and the component being protected. Heat shields, however, are typically conductive and leave too much air volume between the shield and component. This air may superheat and heat the component through convection.

A combination of these two methods is to use a heat blanket and covered fibrous insulation. This solution, however, is not very elegant and is difficult to install properly. If not installed properly, the effectiveness of this solution diminishes.

In view of the preceding, it would be beneficial to develop insulation for components of an aircraft that resists high temperatures and corrosive fluids and that is not excessive in weight or volume. Ideally such insulation would be easy to apply such that its effectiveness was not dependent upon the installer's level of skill.

BRIEF SUMMARY

In one aspect, an embodiment of the present disclosure is directed to an insulation sleeve for insulating a component. The insulation sleeve includes an inner layer, an outer layer, an insulating material, and a flap. The inner layer includes a first material having low thermal conductivity, resistance to high temperatures, and is elastic/semi-rigid. The inner layer has an inner surface formed to a shape to fit the component being insulated. The outer layer has a second material having low thermal conductivity, resistance to high temperatures, and is elastic/semi-rigid. The insulating material is positioned between the inner layer and the outer layer and has low thermal conductivity, low heat storage, and resistance to high temperatures, The flap includes a third material having low thermal conductivity and resistance to high temperatures. The flap is secured to the outer layer at a first location and is releasably secured to the outer layer at a second location. The inner layer, outer layer, and insulating material have a seam, and the internal layer and external layer are self-biased to close the seam with the flap covering the seam with the first location and the second location on opposing sides of the seam.

In some embodiments, the inner layer includes at least one ply of fiberglass impregnated silicone. In some embodiments, the outer layer includes at least one ply of fiberglass impregnated silicone. In some embodiments, the insulating layer includes a mineral wool.

In some embodiments, the flap is releasably secured to the outer layer by hook and loop fasteners. In some embodiments, the insulation sleeve further includes extensions sized to cover secondary, mating components adjacent the component.

In some embodiments, the insulating layer is encapsulated by a layer of fiberglass impregnated silicone rubber.

In another aspect, embodiment of the present disclosure includes a method for forming an insulation sleeve for a component. The method includes forming an inner layer of a first material that is insulating, resistant to high temperature, elastic/semi-rigid to a shape to fit the component to be insulated, forming an outer layer of a second material that is insulating, resistant to high temperature, and elastic/semi-rigid, placing an insulating material between the inner layer and the outer layer, securing the inner layer to the outer layer in at least one area to encapsulate the insulating material while leaving a seam, securing a high temperature resistant flap to the outer layer adjacent the seam, and securing a releasable attachment mechanism to the flap for securing the flap to the third layer.

In some embodiments, the first material is fiberglass impregnated silicone rubber. In some embodiments, the insulating material includes mineral fibers.

In some embodiments, the releasable attachment mechanism is a hook and loop fastener. In some embodiments, the inner layer and the outer layer are self-biased to an orientation closing the seam.

DETAILED DESCRIPTION OF THE DRAWINGS AND THE PRESENTLY PREFERRED EMBODIMENTS

The present embodiments will now be further described. In the following passages, different aspects of the embodiments are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Figure 2:
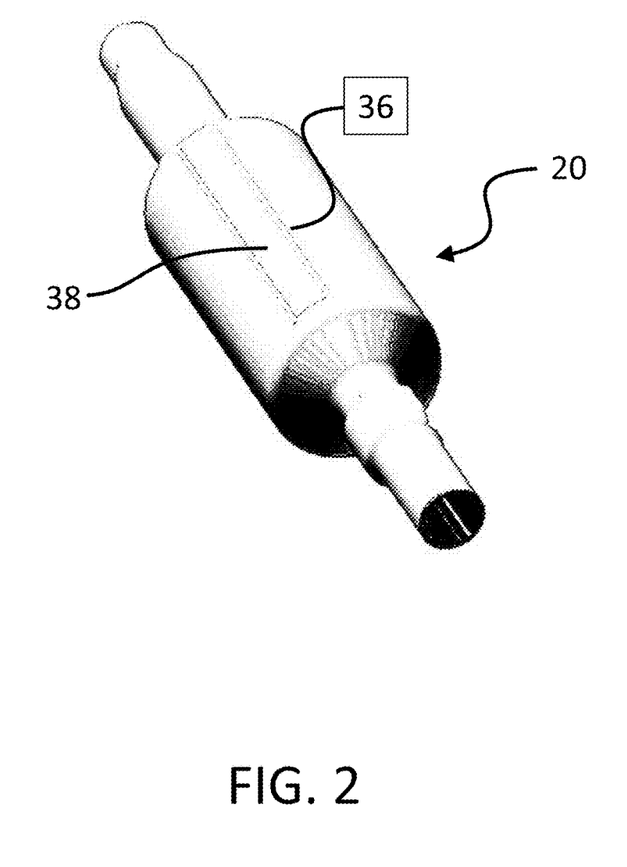
FIG. 2 illustrates a perspective view of an embodiment of an insulation sleeve for protection of the component of FIG. 1
Figure 3:
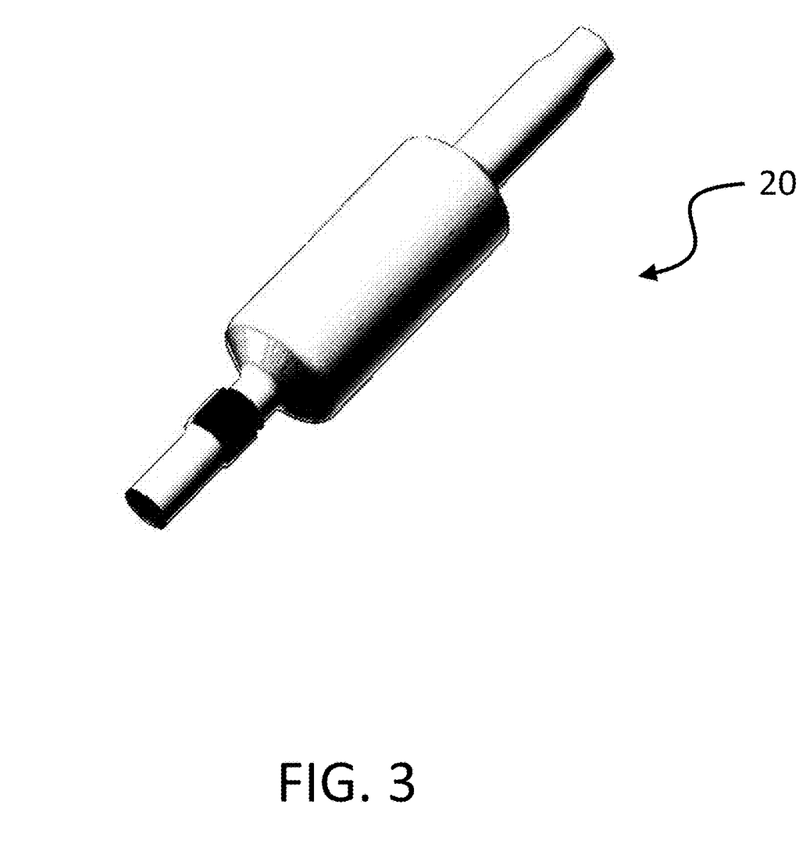
FIG. 3 illustrates a perspective view of the embodiment of an insulation sleeve for protection of the component of FIG. 1.
Figure 4:
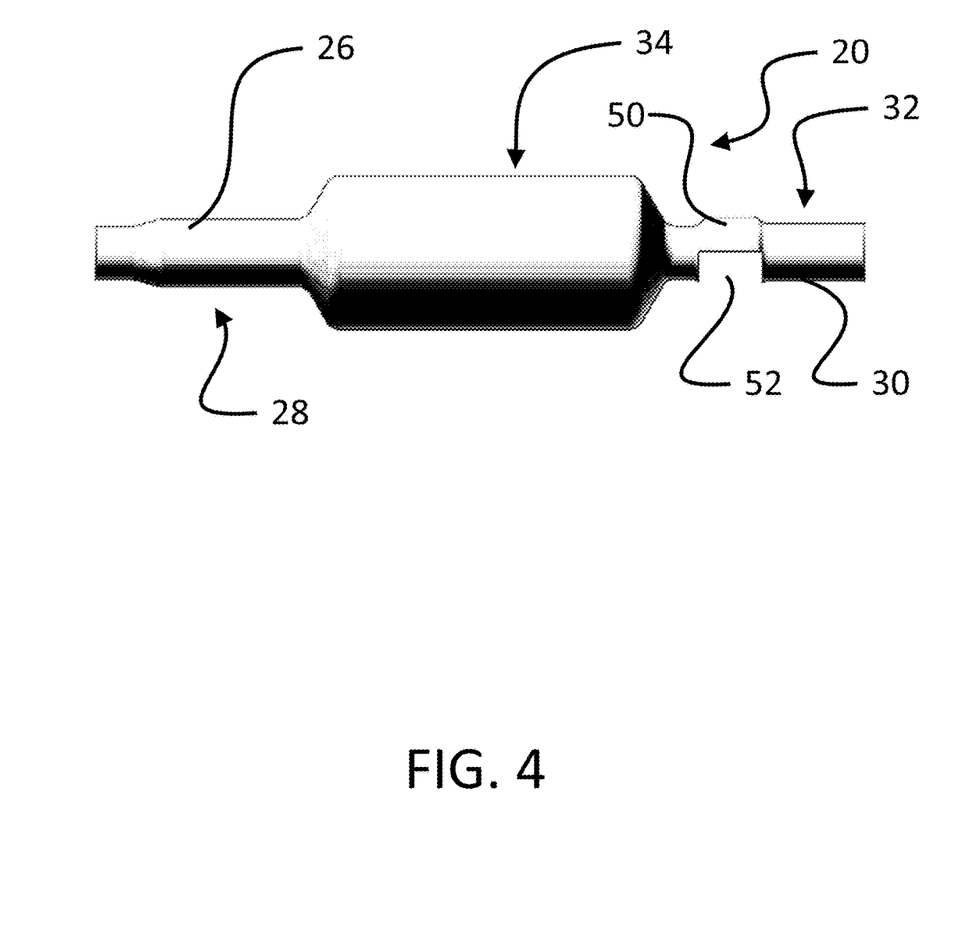
FIG. 4 illustrates a side view of an embodiment of an insulation sleeve for protection of the component of FIG. 1.

FIG. 2 and FIG. 3 illustrate perspective views of an embodiment of an insulation sleeve 20 for insulating the check valve 10 of FIG. 1. FIG. 4 illustrates a side view of the insulation sleeve 20. Although the insulation sleeve 20 will be described in relation to the check valve 10 of FIG. 1, the described construction and features are suitable for protection of other components, and embodiments are not limited to the insulation of check valves.

The insulation sleeve 20 has a multilayer wall 22 as will be described in reference to FIG. 5 and FIG. 6. The multilayer wall 22 encloses a cavity 24 that is sized and shaped to fit the check valve 10, or other component being insulated. For example, insulation sleeve 20 may have a cavity 24 having an inner surface sized and shaped to complement the size and shape of the outer surface of the check valve 10. Preferably, the cavity 24 fits closely to the outer surface of the check valve 10, such that any air gap between the check valve 10 and the insulation sleeve 20 is minimized.

The multilayer wall 22 has a first extension 26 on a first end 28 and a second extension 30 on a second end 32. The extensions 26, 30 provide an elongated opening into the cavity 24 for access to the check valve 10, while providing limited insulation for secondary components, such as hydraulic lines. Although the current embodiment is shown having two extensions 26, 30 and are cylindrical in shape, other shapes and configurations are possible. For example, a hydraulic component such as a valve could have three hydraulic lines and be generally square in shape. Thus, the insulation sleeve may be generally square in shape with three extensions, one for each of the hydraulic lines.

Between the first extension 26 and the second extension 30 is the main portion 34 of the insulation sleeve 20. Within the main portion 34, the multilayer wall 22 has an access seam 36 for accessing the cavity 24 through the multilayer wall 22. The access seam 36 is sized to be large enough to pass the component through the multilayer wall 22. Additionally, a flap 38 covers the access seam 36 to inhibit gasses from passing though the access seam 36 into the cavity 24. The flap 38 is secured to the multilayer wall at a first side of the seam and is releasably secured to the multilayer wall at an opposing side of the seam. The flap 38 may be formed of the same material as an outer layer of the multilayer wall 22. The flap 38 may be secured using common fastening techniques such stitching, riveting, and adhesives, and may be releasably secured using common fastening techniques such as hook and loop fasteners, snaps, zippers, and buttons. In one embodiment, the flap 38 has a pad of stainless steel hook and loop fasteners stitched to the flap 38 using stainless steel thread, and a corresponding pad of stainless steel hook and loop fasters is stitched to the outer layer of the multilayer wall 22 to form a releasable connection.

Figure 5:
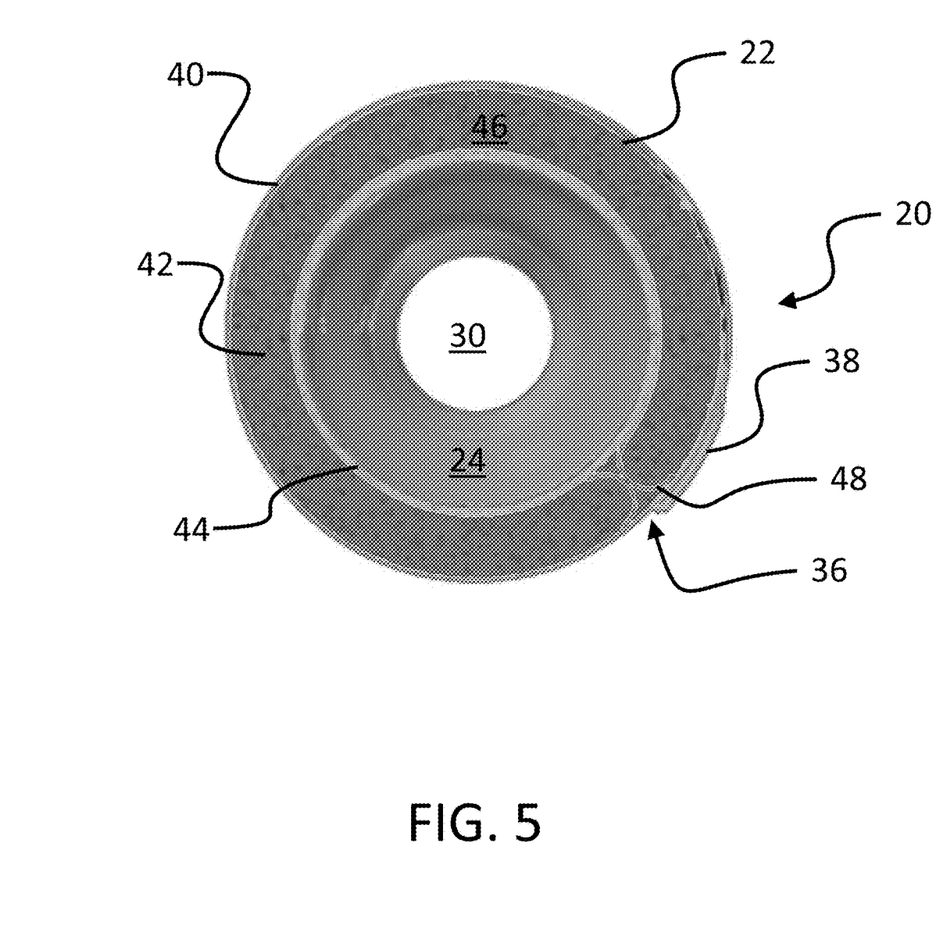
FIG. 5 illustrates a cross-sectional view of the insulation sleeve of FIG. 2.
Figure 6:
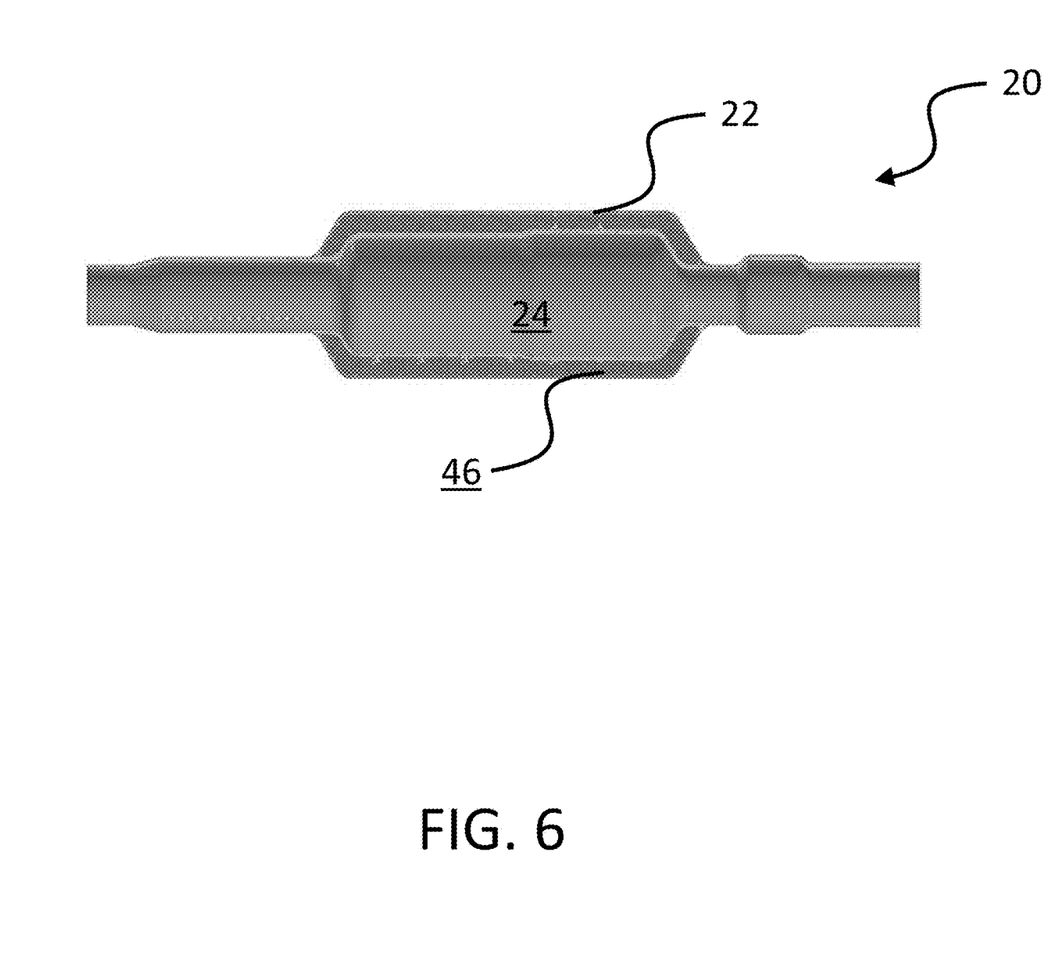
FIG. 6 illustrates a cross-sectional view of the insulation sleeve of FIG. 2.

FIG. 5 and FIG. 6 illustrate a cross-sectional view of the insulation sleeve 20 of FIG. 2, with FIG. 5 illustrating an axial cross section of the main portion 34 and FIG. 6 illustrating the longitudinal cross section. The multilayer wall 22 encloses the cavity 24 while the second extension 30 can be seen providing access to the cavity 24. The multilayer wall 22 has an inner layer 44 formed of an elastic/semi-rigid material, a middle layer 42 formed of an insulating material, and an outer layer 40 formed of an elastic/semi-rigid material. An elastic/semi-rigid material is one that resists a distorting stress and returns to its original shape when the distorting stress is removed. Thus, the elastic/semi-rigid material of the inner layer and the outer layer is one that is capable of being distorted by a force, but resists the distortion and returns to its original shape when the force is removed.

In addition to being elastic/semi-rigid, the inner layer 44 is resistant to high temperatures. In some embodiments, the inner layer 44 is formed of a silicone impregnated glass fiber. Because the inner layer 44 is semi-rigid and maintains its shape, it may be made to fit tightly around a shape. For example, a fabric of silicone impregnated glass fiber may be laid up over a mandrel corresponding to the component being insulated. When the silicone impregnated glass fiber blanket is removed, it will have a natural shape that complements the outer surface of the component. In some embodiments, multiple layers of fabric may be laid up over a mandrel to increase the rigidity of the layer.

The outer layer 40 is formed of an elastic/semi-rigid material and in some embodiments, it may be the same material that formed the inner layer 44. In the main portion 34 of the insulation sleeve 20, the inner layer 44 and the outer layer 40 have an annular space formed between them. The annular space is filled with the middle layer 52 of material. Because the inner layer 44 and the outer layer 40 are semi-rigid and maintain their shape, the middle layer 42 may include a less durable insulating material 46, such as mineral fiber.

The inner layer 44 and the outer layer 40 enclose the insulating material 46 such that it is not exposed to the ambient environment. As shown in FIG. 5, at the seam 36 where access is provided to the inner cavity 24 the insulating material is encapsulated by an end portion 48 of elastic/semi rigid material. The end portion 48 may be a continuation of the inner layer 44, the outer layer 40, a combination of the inner layer 44 and the outer layer 40, or a separate piece of material. The inner layer 44 and the outer layer 40 are self-biased to their original shape in which the seam 36 is closed and the end portions 48 of the multilayer wall 22 are tightly abutted. Thus, the seam 36 may be opened by forcing the end portions 48 apart, but when released the end portions 48 are biased to return to their closed position.

The extensions 26, 30 have a layered construction that may be the same as the inner layer 44 and the outer layer 40 of the main portion 34, but without the middle layer 42. In some embodiments, the extensions 26, 30 are made up of the inner layer 44 and the outer layer 40 without the void between the layers. For example, in one embodiment the inner layer 44 is formed of three plies of material while the outer layer 40 is formed of a single ply of material. The extension may then be formed of four layers, the three from the inner layer 44 and the one from the outer layer 40.

The extensions 26, 30 may be sized and shaped to fit over components that are to be connected to the component being insulated. For example, the check valve 10 of FIG. 1 has two tubes that would connect to it. Thus, extension 26 and 30 are sized and shaped to cover the tubes that connect to the check valve 10. Additionally, the tube that connects to the second end 32 of check valve 10 requires a hose clamp for connection. The second extension 30 is therefore set up with a bulge 50 for receiving the hose clamp and an opening 52 for accessing the hose clamp. The opening 52 may be orientated away from any likely heat source to avoid direct heating at the opening 52.

Installation of the described insulation sleeve 20 is intuitive and may be performed quickly. To install, the flap 38 is undone and the seam 36 spread open to allow access to the cavity 24. The insulation sleeve 20 is then placed over the component being insulated and allowed to return to its original shape. The flap 38 is then folded over to cover the seam 36 and secured to using the fastener.

The invention claimed is:

1. An insulation sleeve for insulating a component, comprising:
   an inner layer comprising a first material having low thermal conductivity, resistance to high temperatures, and is elastic/semi-rigid, wherein the inner layer has an inner surface formed to a shape to fit the component;
   an outer layer comprising a second material having low thermal conductivity, resistance to high temperatures, and is elastic/semi-rigid;
   an insulating material between the inner layer and the outer layer, the insulating material having low thermal conductivity, low heat storage, and resistance to high temperatures;
   a flap comprising a third material having low thermal conductivity and resistance to high temperatures, the flap secured to the outer layer at a first location and releasably secured outer layer at a second location;
   extensions formed on each end of the sleeve sized to cover secondary, mating components adjacent the component;
   wherein the inner layer, outer layer, and insulating material have a seam, and the internal layer and external layer are self-biased to close the seam, and the flap covers the seam with the first location and the second location on opposing sides of the seam
   wherein the inner layer comprises at least one ply of fiberglass impregnated silicone.

2. The insulation sleeve of claim 1, wherein the outer layer comprises at least one ply of fiberglass impregnated silicone.

3. The insulation sleeve of claim 1, wherein the insulating layer comprises a mineral wool.

4. The insulation sleeve of claim 1, wherein the flap is releasably secured to the outer layer by hook and loop fasteners.

5. The insulation sleeve of claim 1, wherein the insulating layer is encapsulated by a layer of fiberglass impregnated silicone rubber.

6. A method for forming an insulation sleeve for a component, comprising:
   forming an inner layer of a first material that is insulating, resistant to high temperature, and is elastic/semi-rigid to a shape to fit the component to be insulated, the inner layer comprising at least one ply of fiberglass impregnated silicone;
   forming an outer layer of a second material that is insulating, resistant to high temperature, and is elastic/semi-rigid;
   forming extensions on each end of the sleeve sized to cover secondary, mating components adjacent the component;
   placing an insulating material between the inner layer and the outer layer;
   securing the inner layer to the outer layer in at least one area to encapsulate the insulating material while leaving a seam;
   securing a high temperature resistant flap to the outer layer adjacent the seam; and
   securing a releasable attachment mechanism to the flap for securing the flap to the outer layer.

7. The method of claim 6, wherein the first material is fiberglass impregnated silicone rubber.

8. The method of claim 6, wherein the insulating material is comprised of mineral fibers.

9. The method of claim 6, wherein the releasable attachment mechanism is a hook and loop fastener.

10. The method of claim 6, wherein the inner layer and the outer layer are self-biased to an orientation closing the seam.

11. The insulation sleeve of claim 1, wherein the extensions are made up of the inner layer and the outer layer without a void between the inner layer and the outer layer.

* * * * *